United States Patent
Chae et al.

(10) Patent No.: US 11,031,993 B2
(45) Date of Patent: Jun. 8, 2021

(54) METHOD AND APPARATUS FOR PERFORMING RELAY COMMUNICATION BASED ON COUNTER INFORMATION IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 16/477,507

(22) PCT Filed: Jan. 12, 2018

(86) PCT No.: PCT/KR2018/000608
§ 371 (c)(1),
(2) Date: Jul. 11, 2019

(87) PCT Pub. No.: WO2018/131927
PCT Pub. Date: Jul. 19, 2018

(65) Prior Publication Data
US 2019/0372653 A1 Dec. 5, 2019

Related U.S. Application Data

(60) Provisional application No. 62/445,729, filed on Jan. 12, 2017.

(51) Int. Cl.
*H04B 7/14* (2006.01)
*H04B 7/06* (2006.01)
(Continued)

(52) U.S. Cl.
CPC ............ *H04B 7/14* (2013.01); *H04B 7/0617* (2013.01); *H04W 72/0406* (2013.01); *H04W 88/04* (2013.01)

(58) Field of Classification Search
None
See application file for complete search history.

(56) References Cited

U.S. PATENT DOCUMENTS

| 7,979,198 B1 | 7/2011 | Kim et al. |
| 2009/0161578 A1* | 6/2009 | Yeung ............... H04L 45/02 370/254 |

(Continued)

FOREIGN PATENT DOCUMENTS

| KR | 1020060006583 | 1/2006 |
| KR | 1020060020886 | 3/2006 |

(Continued)

OTHER PUBLICATIONS

Patil, U.S. Appl. No. 62/373,593, filed Aug. 11, 2016 (Year: 2016).*

(Continued)

*Primary Examiner* — Jay L Vogel
(74) *Attorney, Agent, or Firm* — Lee, Hong, Degerman, Kang & Waimey PC

(57) ABSTRACT

Provided are a method and an apparatus for performing device-to-device (D2D) relay communication according to various embodiments. Disclosed are the method and the apparatus for performing device-to-device (D2D) relay communication, the method comprising the steps of: receiving a first signal that is beamformed and including counter information and a message, the counter information including at last one counter comparison value established for each direction and at least one counter value; and comparing the at least one counter comparison value established for mutually corresponding directions and the at least one counter value to determine at least one transmission direction, and beamforming a second signal for relaying the message for each of the at least one transmission direction and transmitting same, wherein the second signal includes the counter information in which a counter value corresponding to a (Continued)

transmission direction from among the at least one counter value is modified by a predetermined value, when transmitted in one direction among the at least one transmission direction.

9 Claims, 13 Drawing Sheets

(51) Int. Cl.
*H04W 72/04* (2009.01)
*H04W 88/04* (2009.01)
*H04W 72/02* (2009.01)
*H04B 7/0413* (2017.01)
*H04W 4/00* (2018.01)

(56) References Cited

U.S. PATENT DOCUMENTS

2009/0310608 A1* 12/2009 Chen ............... H04W 76/50 370/389
2014/0023077 A1* 1/2014 Piltonen ............... H04L 45/16 370/392
2016/0227495 A1* 8/2016 Lee ................... H04W 72/04
2018/0049162 A1* 2/2018 Patil ................. H04W 72/04
2018/0234163 A1* 8/2018 Yasukawa ......... H04B 7/15542

FOREIGN PATENT DOCUMENTS

KR 1020160145648 12/2016
WO WO-2015046985 A1 * 4/2015 ........... H04L 5/0048

OTHER PUBLICATIONS

PCT International Application No. PCT/KR2018/000608, Written Opinion of the International Searching Authority dated Apr. 27, 2018, 23 pages.
Al-Humoud, S. et al., "The dynamic counter-based broadcast for mobile ad hoc networks", PhD Thesis, University of Glasgow, Jul. 2011, 128 pages.

* cited by examiner (a)

(b)

METHOD AND APPARATUS FOR PERFORMING RELAY COMMUNICATION BASED ON COUNTER INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2018/000608, filed on Jan. 12, 2018, which claims the benefit of U.S. Provisional Application No. 62/445,729, filed on Jan. 12, 2017, the contents of which are all hereby incorporated by reference herein in their entirety.

TECHNICAL FIELD

The present disclosure relates to a wireless communication system, and more particularly, to a method and apparatus for performing relay communication in at least one signal direction based on counter information configured for each signal direction.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide a method of relaying and transmitting a received D2D signal in at least one signal direction based on counter information configured for each signal direction.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of performing device-to-device (D2D) relay communication by a user equipment (UE) in a wireless communication system. The method may include receiving a first signal, wherein the first signal is beamformed and includes a message and counter information including at least one counter comparison value and at least one counter value configured for each direction, determining at least one transmission direction by comparing the at least one counter comparison value and the at least one counter value configured for corresponding directions, and transmitting a second signal for relaying the message in each of the at least one transmission direction by applying beamforming the second signal. When the second signal is transmitted in one of the at least one transmission direction, the second signal may include the counter information in which a counter value corresponding to the transmission direction among the at least one counter value is changed by a predetermined value.

According to an embodiment of the present disclosure, the at least one transmission direction may be determined based on a direction in which the counter comparison value and the counter value are different from each other and a direction of the first signal.

According to an embodiment of the present disclosure, the counter comparison value may be configured differently for each signal direction.

According to an embodiment of the present disclosure, the predetermined value may be configured differently for each signal direction.

According to an embodiment of the present disclosure, the at least one counter comparison value may be preset to a same value for each signal direction.

According to an embodiment of the present disclosure, the second signal may not be transmitted in a direction in which the counter comparison value and the counter value are equal to each other.

According to an embodiment of the present disclosure, the at least one transmission direction may correspond to a direction of the first signal.

According to an embodiment of the present disclosure, the counter information may be transmitted in a control signal of a physical layer of the UE or a radio resource control (RRC) signal of a higher layer.

According to an embodiment of the present disclosure, the method may further include allocating a resource for transmitting the second signal based on sensing information obtained by sensing a radio resource region for the at least one transmission direction.

Advantageous Effects

According to embodiments of the present disclosure, a received D2D signal can be relayed in at least one signal direction based on counter information configured for each signal direction It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
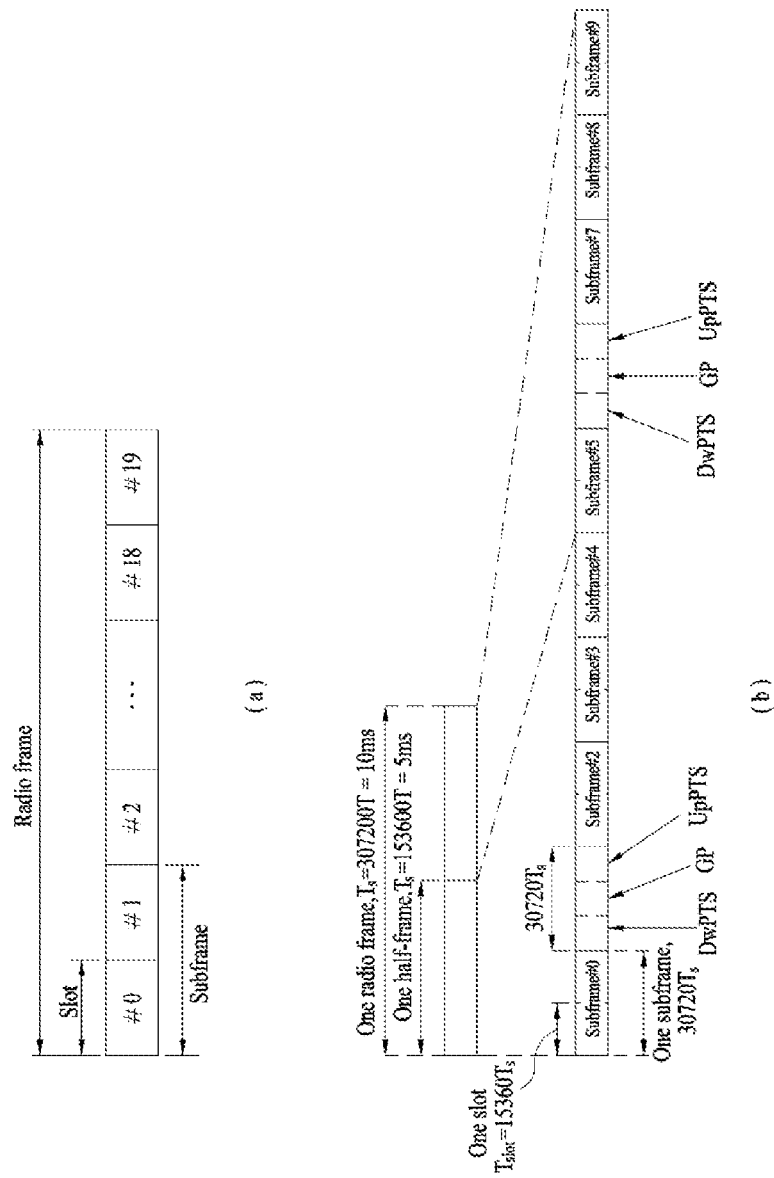
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-

OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
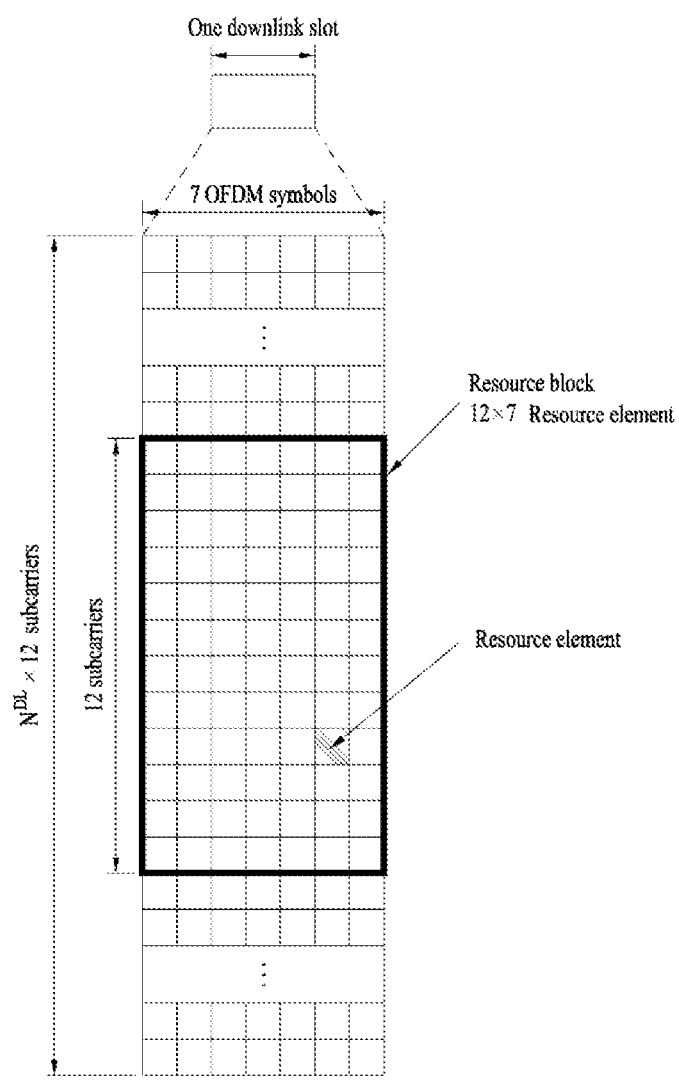
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
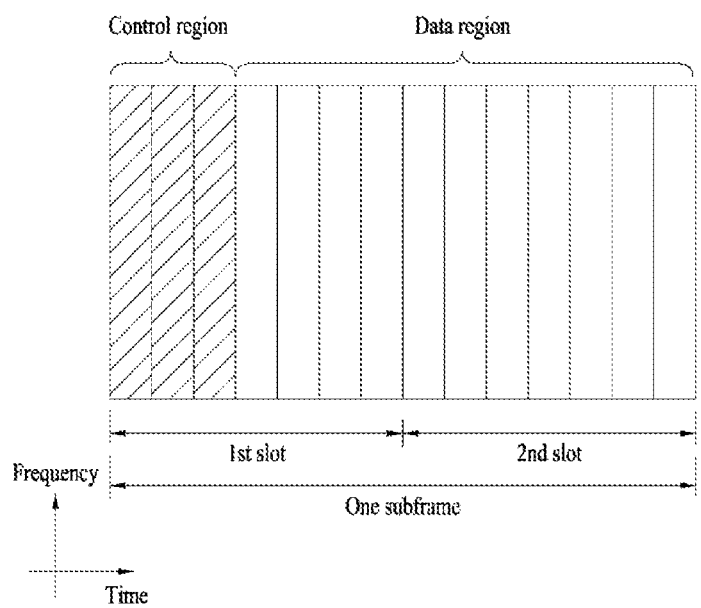
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
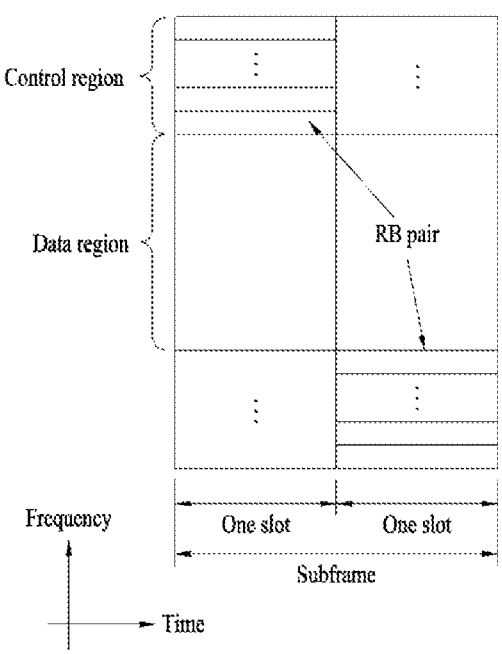
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
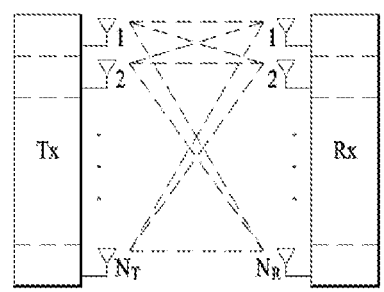
FIG. 5 is a view illustrating the configuration of a wireless communication system having multiple antennas.
Figure 5:
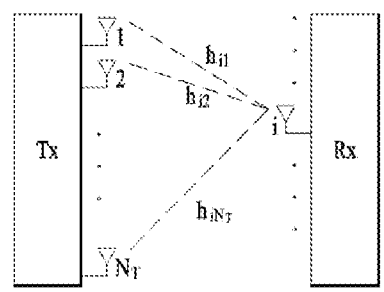

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
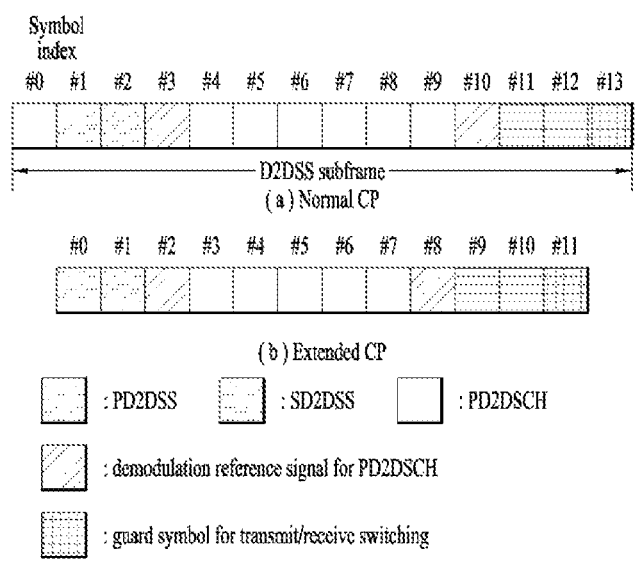
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
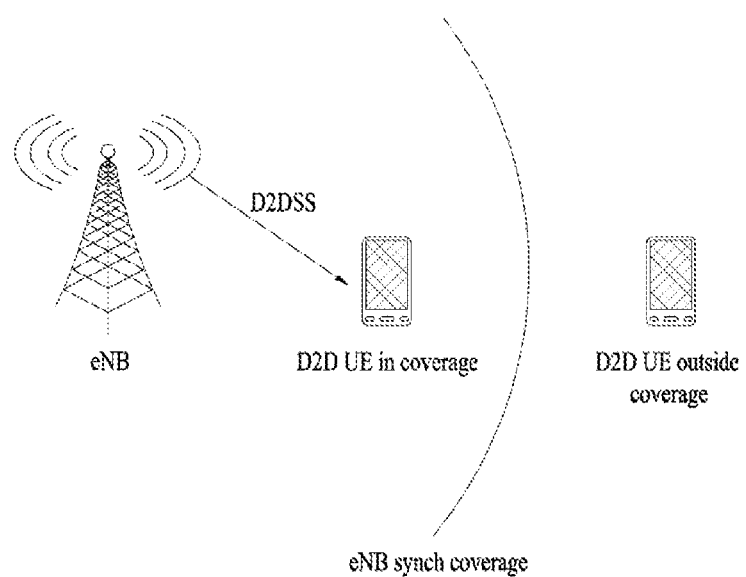
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
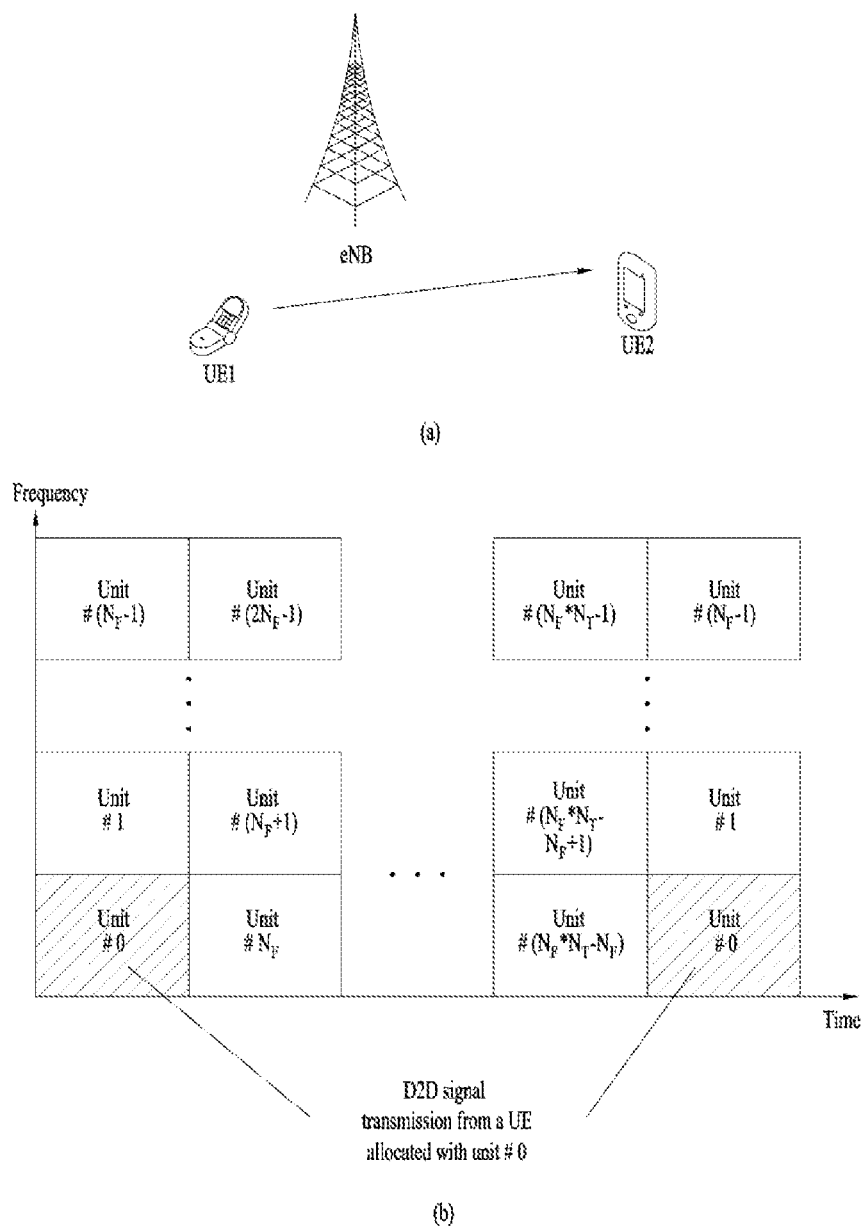
FIG. 8 is a view illustrating an exemplary D2D resource pool for D2D.

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located in coverage of an eNB, the eNB may inform UE1 of the resource pool. If UE1 is located out of the coverage of the eNB, the resource pool may be informed by a different UE or determined using predetermined resources. In general, a resource pool includes a plurality of resource units. A UE may select one or more resource units from among a plurality of the resource units and use the selected resource unit(s) for D2D signal transmission. FIG. 8(b) shows an example of configuring a resource unit. Referring to FIG. 8(b), all frequency resources are divided into $N_F$ resource units and all time resources are divided into $N_T$ resource units, and thus, a total of $N_F*N_T$ resource units are defined. In this case, a resource pool may be repeated with a periodicity of $N_T$ subframes. In particular, one resource unit may be periodically repeated as shown in FIG. 8. Alternatively, the index of a physical resource unit mapped to a logical resource unit may change over time according to a predetermined pattern to obtain diversity gain in the time or frequency domain. In this resource unit structure, a resource pool may mean a set of resource units that can be used by a UE for D2D signal transmission.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
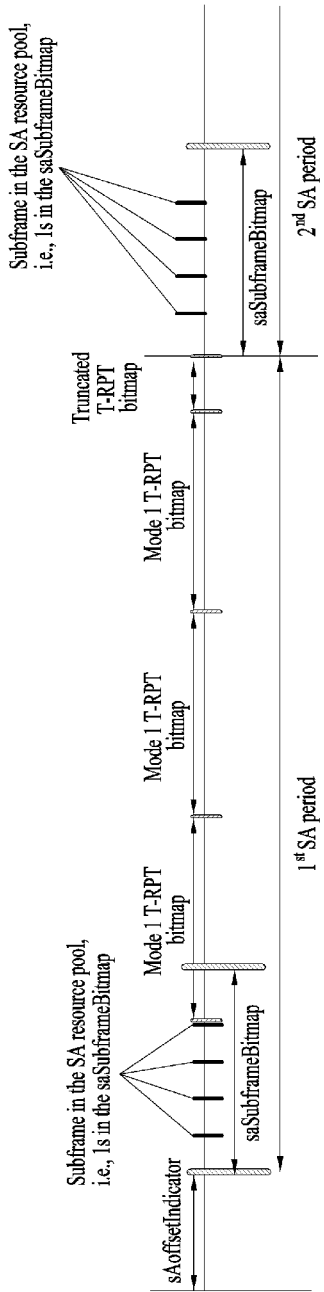
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1s set in a T-RPT bitmap in an indicated T-RPT, and transmits one medium access control layer protocol data unit (MAC PDU) four times.

In V2V communication, a periodic type of cooperative awareness message (CAM) and an event-triggered type of decentralized environmental notification message (DENM) may be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown, an accident, etc. The DENM may be shorter than 3000 bytes, and it may be received by all vehicles within the transmission range. The DENM may have priority over the CAM. When it is said that messages are prioritized, it may mean that from the perspective of a UE, if there are a plurality of messages to be transmitted at the same time, a message with the highest priority is preferentially transmitted, or among the plurality of messages, the message with highest priority is transmitted earlier in time than other messages. From the perspective of multiple UEs, a high-priority message may be regarded to be less vulnerable to interference than a low-priority message, thereby reducing the probability of reception error. If security overhead is included in the CAM, the CAM may have a large message size compared to when there is no security overhead.

Figure 10:
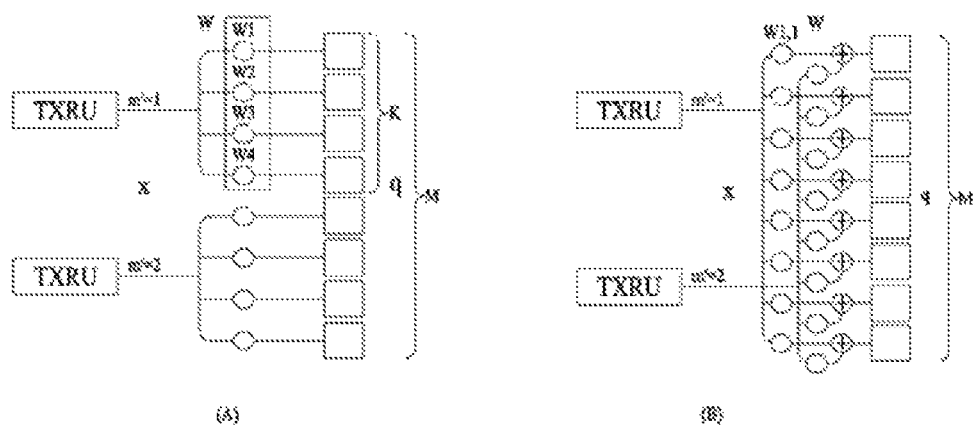
FIG. 10 illustrates examples of a connection scheme between TXRUs and antenna elements.

FIG. 10 illustrates examples of a connection scheme between TXRUs and antenna elements.

(a) of FIG. 10 illustrates that TXRU is connected to a sub-array. In this case, the antenna elements are connected to only one TXRU. Unlike (a) of FIG. 10, (b) of FIG. 10 illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as new RAT in the present disclosure.

Figure 11:
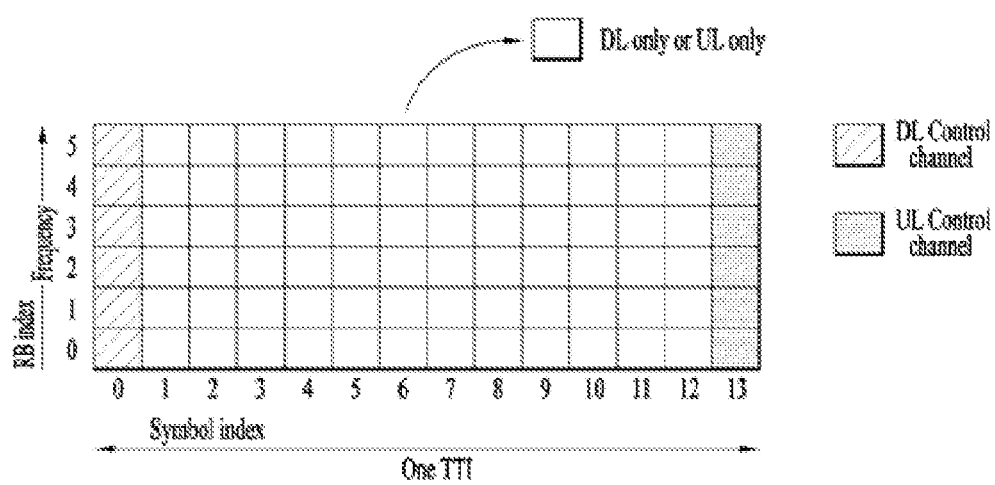
FIG. 11 illustrates an example of a self-contained subframe structure.

A self-contained subframe structure shown in FIG. 11 is considered in the fifth generation new RAT to minimize data transmission latency in a TDD system. FIG. 8 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the new RAT may consider four subframe types as follows.

downlink control period+downlink data period+GP+uplink control period
    downlink control period+downlink data period
    downlink control period+GP+uplink data period+uplink control period
    downlink control period+GP+uplink data period In the 5G new RAT, a signal transmission method may vary depending on services or requirements. For example, in the case of enhanced mobile broadband (eMBB), length of a transmission time unit may increase, whereas in the case of ultra-reliable and low latency communications (URLLC), the length of the transmission time unit may decrease.

In the URLLC, although there is an ongoing eMBB transmission, a URLLC signal may be transmitted on a corresponding resource depending on service types, and more particularly, in the case of an urgent service. Thus, from the perspective of a network or a UE, the URLLC transmission may be regarded as preemption of some resources for the eMBB transmission.

Due to the preemption, some resources for the eMBB transmission, where the length of the transmission time unit increase, may be punctured. In addition, the signal may be changed since it is superimposed with another signal, for example, a URLLC signal.

When the URLLC transmission occupies some resources for the eMBB transmission, a UE may fail to decode a specific code block (CB) for the eMBB transmission. In particular, even when a channel state is good, the resource preemption may cause the decoding failure of the specific CB. Therefore, the 5G new RAT may consider performing retransmission on a CB basis rather than a transport block (TB) basis.

Beamforming in mmW

In a millimeter wave (mmW) system, since a wavelength is shortened, a plurality of antenna elements can be installed in the same area. That is, considering that the wavelength in the 30 GHz band is 1 cm, a total of 64 (8×8) antenna elements may be installed in a 4 by 4 cm panel at intervals of 0.5 lambda (wavelength) in the case of a 2-dimensional array. Therefore, in the mmW system, it is attempted to improve coverage or throughput by increasing beamforming (BF) gain using multiple antenna elements.

If each antenna element is equipped with a transceiver unit (TXRU) to enable adjustment of transmission power and phases per antenna element, independent BF may be performed on each frequency resource. However, installing TXRUs in all about 100 antenna elements is less feasible in terms of cost. Therefore, a method of mapping a plurality of antenna elements to one TXRU and adjusting the direction of a beam using an analog phase shifter has been considered. However, such an analog BF method is disadvantageous in that frequency selective BF is impossible because only one beam direction is generated over the whole band.

As an intermediate form of digital BF and analog BF, hybrid BF with B TXRUs fewer than Q antenna elements may be considered. In the case of the hybrid BF, the number of beam directions that can be transmitted at the same time is limited to B or less although it depends on how the B TXRUs and the Q antenna elements are connected.

Relaying of D2D Signal in mmW

Hereinafter, a method of efficiently performing relaying in mmW will be described. In D2D communication using mmW, a UE needs to transmit an emergency message to a randomly discovered UE, and other UEs should relay the emergency message. In some cases, broadcasting may be required (e.g., in the case of an emergency message, a safety message, etc.). In particular, in the mmW system, a signal can be transmitted only when a beam is matched. In this case, it is efficient that critical information is transmitted to neighboring UEs by introducing a multi-hop relay technology, etc.

To this end, a UE performing initial transmission (hereinafter such a UE is referred to as an initial transmission UE) may transmit to a relay UE an indication indicating that a specific type of message should be relayed (for example, an indication of information flooding, an indication indicating that the degree of emergency of the message is more than or equal to a predetermined level or the coverage required for the message is more than or equal to a predetermined threshold). Upon receiving the message including such an indication, the UE need to relay the corresponding message to neighboring UEs. In the following, how a UE relays (retransmits) such a message to neighboring UEs upon receiving the message will be described in detail.

When information flooding occurs in the mmW (or mmWave) system, relay (or relaying) UEs may perform transmission in all directions where the relay UEs can detect other UEs. When the UEs perform relaying in all directions, a specific UE may repeatedly relay a specific message. To avoid such a repetition, the UE may transmit counter information indicating the number of times that the received message is relayed through a physical layer signal (e.g., inter-UE control signal, scheduling assignment, etc.) or a higher layer signal (e.g., MAC or RRC signal). For example, when the counter information is transmitted through the higher layer signal, the counter information may be included in an existing or new field of a MAC header. Alternatively, it may be transmitted on a PSCCH of a physical layer.

For example, an initial transmission UE, which first transmits a message, transmits a counter with a counter value of 0 (i.e., counter 0). Upon receiving the counter with the counter value of 0 (counter 0), a UE transmits the counter by changing the counter value from 0 to 1 (counter 1). Upon receiving the counter (counter 1), a UE may transmit the counter by changing the counter value from 1 to 2 (counter 2). The relay operation may be performed until the counter value becomes equal to a counter comparison value (N) (or counter N) included in the counter information. Alternatively, when a UE initially transmits a message, the UE may set a counter value to a specific value. Then, whenever other UEs relay the message, the counter value is reduced by 1. The relay operation may be performed until the counter value becomes zero.

This operation allows a specific message to be relayed a predetermined number of times, that is, prevents UEs from performing the relay operation too many times. The counter comparison value (N) may be predetermined. Alternatively, the counter comparison value may be determined by a transmission UE or a network according to message types or message priorities. The counter comparison value may vary depending on the congestion level of a channel. In addition, the UE may determine the congestion level of a surrounding channel by measuring a channel busy ration (CBR), etc. The CBR indicates the amount (or ratio) of radio resources occupied by another UE during a certain time period. When the measured CBR is more than or equal to a predetermined threshold, the UE may change the number of times that the specific message is relayed, N. In this case, the number of times of relaying, which depends on the CBR, may be predetermined. In addition, the network may inform a D2D signal transmission or reception UE of the number of times of relaying through a physical layer signal or a higher layer signal. The counter information may include at least one counter value configured for each direction (or a value indicating how many times relaying is performed so far) and at least one counter comparison value (N). The counter information may further include information on each direction.

In the mmW system, the counter comparison value (or counter threshold) for preventing the information flooding may vary depending on directions (e.g., four cardinal directions, i.e., the North, South, East, and West, latitude, longitude, etc.) based on the geometry of a road. For example, when an initial transmission UE intends to inform a vehicle in the rear that an accident occurs in front of the initial transmission UE, the initial transmission UE may configure a first counter comparison value (counter N1) for the front and rear directions and configure a second counter comparison value (counter N2) for the left and right directions (where N2<N1). In other words, the occurrence of the accident may be relayed in the front and rear directions as many as the first counter comparison value (counter N1) and in the left and right directions as many as the second counter comparison value (counter N2) (where N2<N1). The counter comparison value (the number of times of relaying or the threshold) for each direction may be predetermined, configured by a transmission UE, predefined for each message type, or signaled by a network to a UE through a physical layer signal or a higher layer signal.

For example, information on a message type may be transmitted through a physical layer signal (e.g., inter-UE control signal, scheduling assignment, etc.) or a higher layer signal (e.g., MAC or RRC signal). Assuming that upon receipt of a message, a UE is capable of knowing which direction the message is received in, the UE may also determine which direction the UE should forward the message in based on the direction in which the message is received. In addition, the UE may adjust the counter value of a counter configured for the direction in which the UE forwards the message.

In the above-described operation, when the coverage for each direction or the hop counter value for each direction of a corresponding message is signaled to neighboring UEs through a physical layer signal or a higher layer signal, the expression of "direction" may represent latitude, longitude, a direction, or an angle with respect to a specific direction (for example, the north direction) or position. For example, when a UE is moving, information indicating that a message should be transmitted to certain latitude and longitude with respect to a specific position may be signaled through a physical layer signal or a higher layer signal. Alternatively, the maximum hop counter may be set to N1 for a specific direction and angle with respect to a specific position and N2 for a different direction and angle with respect to the specific position. Information on the directions and angles may also be signaled to neighboring UEs through a physical layer signal or a higher layer signal. In this case, the threshold range of an angle, the number of angle ranges, etc. may be defined in advance or determined autonomously by a UE. Alternatively, the granularity thereof may be signaled by the network to a UE. As described above, each hop counter may be configured for the front, rear, left, and right directions with respect to the moving direction of a UE. This could be interpreted to mean that the hop counter for each direction is represented with respect to the UE's moving direction. The front, left, or right boundary may be configured within a 45 degree angle with respect to a direction perpendicular to the moving direction.

Meanwhile, a relay UE may detect the direction of a first signal. Based on the detected direction of the first signal, the relay UE may obtain at least one counter comparison value and a specific direction corresponding to at least one counter comparison value. For example, when receiving counter information including a first counter value and a first counter comparison value configured for the left, a second counter value and a second counter comparison value configured for the right, and a third counter value and a third counter comparison value configured for the front, the relay UE may obtain direction information on the front, left, and right with respect to the transmission direction of the first signal (from the perspective of a UE that transmits a message).

Specifically, the counter information includes at least one counter comparison value (the counter comparison value corresponds to N or a threshold) and at least one counter value, which are configured for each direction. In this case, the relay UE may compare the counter comparison value and the counter value, which are included in the counter information, for each direction and then determine at least one transmission direction based on the direction of the first signal. The relay UE may transmit a relay signal in the determined at least one transmission direction, and the relay signal may include counter information in which a counter value corresponding to the transmission direction is changed.

Figure 12:
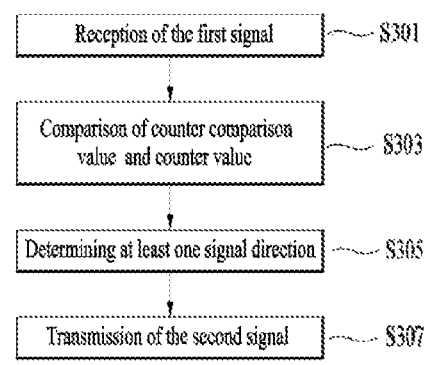
FIG. 12 is a flowchart illustrating a method by which a UE transmits a relay signal in at least one direction according to an embodiment of the present disclosure.

FIG. 12 is a flowchart illustrating a method by which a UE transmits a relay signal in at least one direction according to an embodiment of the present disclosure.

Referring to FIG. 12, a relay UE may receive a first signal including a message and counter information including at least one counter comparison value and at least one counter value (or at least one counter having at least one counter value configured therein) configured for each direction. For example, the relay UE may receive the first signal including a first message and counter information including counter comparison values a1, b1, and c1 respectively configured for directions A, B, and C and counter values a2, b2, and c2 respectively configured for directions A, B, and C (S301). The relay UE may compare the counter comparison value and the counter value included in the counter information, and more particularly, compares the counter comparison value and the counter value configured for corresponding directions. For example, when the counter information includes two counter values and two counter comparison values respectively configured for directions A and B, the relay UE may compare a counter comparison value and a counter value configured for direction A and compares a counter comparison value and a counter value configured for direction B (S303).

The relay UE may determine at least one direction where the counter value is different from the counter comparison value and also determine at least one transmission direction for transmitting the relay signal, which correspond to the determined at least one direction. In this case, direction information indicating which direction the counter comparison value and the counter value corresponds to may be included in the counter information or the first signal. Based on the direction information, the relay UE may determine a direction where the counter value is different from the counter comparison value. Meanwhile, the direction information may indicate a particular direction, for example, the South, the West, etc. or a relative direction for example, the front, rear, left, and right. In the latter, the front, rear, left and right may be determined with respect to the direction of a received signal or the relay UE (S305).

For example, when the counter information includes information indicating that a first direction corresponds to a direction between 0 degrees and 30 degrees with respect to the front of the relay UE and information indicating that a third direction corresponds to a direction between −10 degrees and 10 degrees with respect to the left thereof, the relay UE may determine, as the at least one transmission direction, any one direction between 0 degrees and 30 degrees from the front of the relay UE or any one direction between −10 degrees and 10 degrees from the left thereof. In addition, if the relay signal is beamformed and transmitted, the direction of a BF link formed with a specific UE, which is between 0 degrees and 30 degrees from the front of the relay UE and between −10 degrees and 10 degrees from the left of the relay UE, among neighboring UEs having BF links formed therebetween may be determined as the transmission direction.

On the contrary, if the counter comparison value and the counter value configured for a specific direction are the same, the relay UE may not transmit the relay signal in the specific direction.

Next, the relay UE transmits a second signal, which is the relay signal for the first signal, in each of the determined at least one transmission direction by applying BF to the second signal. When the second signal is transmitted in one of the at least transmission direction, the second signal may include the counter information where a counter value corresponding to the transmission direction among the at least one counter value is changed by a predetermined value. For example, when the relay UE intends to transmit the second signal in a first transmission direction by applying the BF to the second signal, the relay UE may increase a counter value corresponding to the first transmission direction, which is included in the received counter information, by 1 and transmit the second signal including the counter information where the counter value corresponding to the first transmission direction is increased by 1 in the first transmission direction by applying the BF to the second signal (S307).

For example, assuming that the determined at least one transmission direction includes not only the first transmission direction but a second transmission direction, the counter value corresponding to the first transmission direction is 1, a counter value corresponding to the second transmission direction is 4, and the predetermined value is 2, the relay UE may transmit the second signal including the counter information where the counter value corresponding to the first transmission direction is changed to 3 in the first transmission direction and transmit the second signal including the counter information where the counter value corresponding to the second transmission direction is changed to 6 in the second transmission direction.

Meanwhile, the predetermined value for changing the counter value (or a counter increment value) may be set to 1. In this case, the counter value of a counter in second counter information may be increased or decreased by 1. When the counter value is increased by 1, the counter comparison value may be defined as the maximum counter value. When the counter value is decreased by 1, the counter comparison value may be defined as the minimum counter value.

In addition, the predetermined value (or the counter increment value) may be set to various values (e.g., integers) including 1 and vary depending on signal directions, message types, and/or priorities. For example, the first signal may include information on the type and priority of a message. Alternatively, the predetermined comparison value (or a counter upper limit) may be common for each message, but the predetermined value (or the counter increment value) may vary depending on message types or message priorities. For example, the at least one counter comparison value may be the same for all types of messages. However, the predetermined value may be set to 1 and 2 for a first type of message and a second type of message, respectively. In this case, the first type of message may be more important than the second type of message so that the first type of message may be relayed more times than the second type of message. For instance, if the message needs to be spread further, the counter value may be slowly increased. On the contrary, if the message does not need to be spread further, the counter value may be rapidly increased.

Alternatively, the predetermined value (or the counter increment value) may vary depending on the direction in which the message needs to be relayed. For example, if a specific message needs to be spread further along a road, the predetermined value may be set to 1 so that the counter value may be increased by 1. For a direction perpendicular to the road direction (a direction between +/−X degrees with respect to the perpendicular direction), the predetermined value may be set to 2 so that the counter value may be increased by 2. By doing so, relaying may be performed biased toward a specific direction. In this case, the counter information may include the same counter comparison value for each direction.

Meanwhile, when forming BF links with neighboring UE, the initial transmission UE or the relay UE may receive, from the specific UE, its estimated location and error information (or error range) before transmitting the first or second signal. The initial transmission UE or the relay UE may perform beam sweeping to determine an accurate BF direction for the specific UE based on the specific UE's location and error information. In this case, the error information may carry information on a specific area in which the location of the specific UE can be estimated. For example, the error information may include information on a parameter (e.g., a starting point, a radius, two focal points, a vertex, etc.) indicating one of circle, oval, triangle, and quadrilateral shapes.

Figure 13:
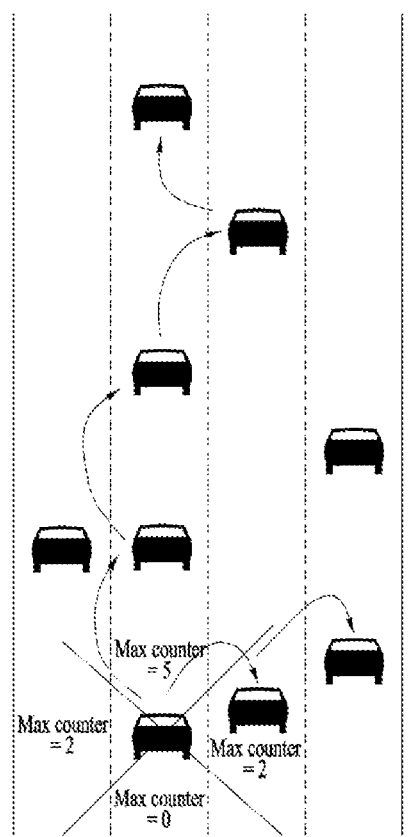
FIG. 13 is a diagram illustrating a process for relaying a signal transmitted from an initial transmission UE.

FIG. 13 is a diagram illustrating a process for relaying a signal transmitted from an initial transmission UE.

In FIG. 13, the number of times that relaying is performed (or a predetermined counter comparison value) may vary depending on directions (or signal directions). Referring to FIG. 12, it can be seen that the maximum counter value (or the counter comparison value described in FIG. 12) is set to 2 in a direction horizontal to the direction in which vehicles move (a direction between −45 degrees and 45 degrees with respect to the vehicle moving direction) and set to 5 in the road direction. In FIG. 13, each UE obtains the counter values of a received message for both the direction horizontal to the vehicle moving direction (the horizontal direction in FIG. 13) and the direction corresponding to the vehicle moving direction (the vertical direction in FIG. 13) from received at least one piece of counter information through a physical layer signal or a higher layer signal (e.g., counter information).

When a relay UE relays a received message in a specific direction, the relay UE may perform transmission by increasing a counter value corresponding to the specific direction by 1. If the counter value for the specific direction of the received message is equal to the maximum counter value (for example, when the counter value for the specific direction in counter information included in a first signal is equal to a counter comparison value), the message no longer needs to be relayed in the specific direction. Meanwhile, although FIG. 13 shows that a UE that relays a message transmits the message in one direction, the present disclosure is not limited thereto, that is, a UE can relay a message in multiple directions.

Selection of Resource for Relaying

A relay UE may relay the same message multiple times depending on beam directions, and in this case, a resource for each beam direction may be determined by an initial transmission UE. That is, a transmission UE may indicate to a reception UE (i.e., a UE that performs relaying) the location of a resource for relaying per beam direction through a physical layer (sidelink control channel) signal or a higher layer (MAC or RRC) signal. Specifically, the initial transmission UE may configure a time-frequency resource for each transmission beam through resource sensing or in a random manner, and in this case, the resource may be designated separately for each hop or counter. This method may allow SFN transmission between UEs since the resource for relaying is designated by the initial transmission UE. However, according to the method, since the resource is selected by the initial transmission UE, the resource may not be the best resource from the perspective of the reception UE.

To solve this problem, a relay UE may determine a resource for relaying by autonomously performing sensing (per direction or analog/digital beam). Specifically, since resources for relaying are autonomously selected by relay UEs in each hop, the UEs may have different time-frequency resources in each hop.

Meanwhile, according to this method, since relay UEs select resources in a distributed manner, the amount of radio resources for relaying may increase as the hop count increases. To overcome this problem, a resource region or candidate resources that can be used by relay UEs in each hop may be determined by an initial transmission UE or a network. For example, resources for retransmitting a message may be configured as a separate resource region (i.e., resource pool/group) in each hop. In addition, if a specific message is configured to be transmitted or relayed only in a predetermined specific time/frequency resource region, relay UEs may perform transmission by selecting more suitable resources in each hop. Also, coverage may be extended since SFN effects may be achieved between some UEs.

Meanwhile, the number of relay UEs may increase as the hop count increase. If too many relay UEs perform relaying in a specific hop, it may cause excessive use of radio resources. To prevent the excessive use of radio resources, the present disclosure proposes a method of measuring a congestion level and/or performing congestion control separately in each hop or beam direction.

Before performing relaying, a relay UE senses a radio resource region and then selects a resource for transmission (e.g., a resource which has energy less than a predetermined threshold and is not used by another UE). In this case, the amount of resources to be selected may be configured to be variable according to the congestion level (e.g., the amount of occupied resources, the amount of resources with received energy more than a predetermined threshold in a certain resource region, a CBR, etc.) observed in the resource region in a corresponding hop. Since a different amount of interference may be measured in each beam direction in the mmW system, the present disclosure proposes a method of performing measurement for congestion control (e.g., the signal-to-noise ratio (SNR), reference signal received power (RSRP), and/or received signal strength indication (RSSI) of a received signal) and the congestion control in each beam direction. According to such an operation variable per relay hop based on congestion levels, a transmission UE may signal to neighboring UEs the maximum hop count (counter comparison value) for each direction by measuring its congestion level, and each relay UE may determine whether to relay a received message by measuring its congestion level. In the latter, the maximum relay hop counter (counter comparison value) depending on congestion levels should be known to the relay UE or signaled by the transmission UE or the network. If the congestion level is equal to or more than a predetermined threshold, the maximum hop counter (counter comparison value) may be obtained by applying a prescribed offset to the maximum hop counter indicated by the transmission UE.

A relay UE may obtain sensing information by sensing a radio resource region for each of at least one transmission direction in which a second signal is transmitted. The sensing information may include information on at least one of the SNR, RSRP, and RSSI of a first signal. The relay UE may allocate a resource for the second signal to be transmitted in one of at least one signal direction based on the sensing information.

For example, a resource region that the relay UE can use in each hop may be configured by the network or transmission UE. The amount of resources for relaying in the corresponding resource region may depend on the congestion level of the corresponding resource region. When the amount of resources to be used in a first hop (hop count 1) and the amount of resources to be used in a second hop (hop count 2) are configured, if the congestion level of the second hop is high, retransmission is restricted in a corresponding resource pool, and there may be a relay UE that does not perform relaying.

Figure 14:
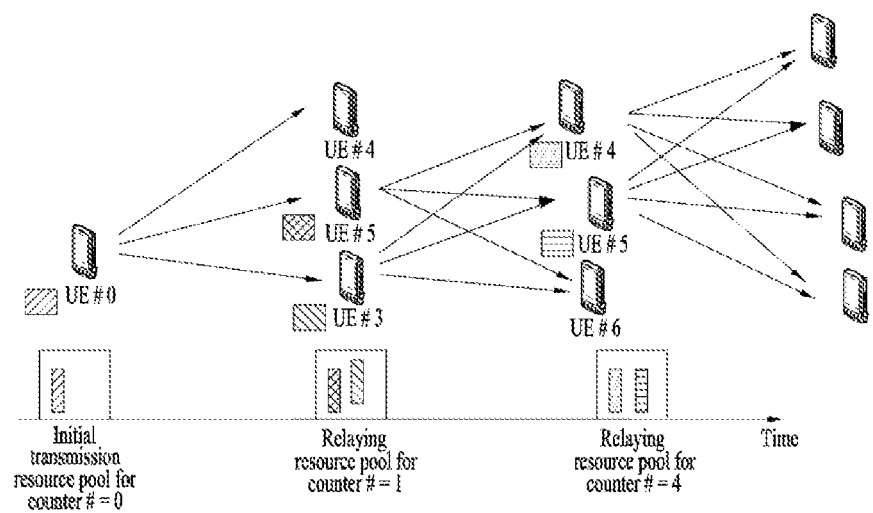
FIG. 14 is a diagram illustrating a method of allocating a resource required for relaying according to an embodiment of the present disclosure.

FIG. 14 is a diagram illustrating a method of allocating a resource required for relaying according to an embodiment of the present disclosure. In FIG. 14, a message from UE #0 is relayed. Specifically, FIG. 14 shows an example in which congestion control is separately performed in a different resource region in each hop and then relaying is performed by some UEs rather than all UEs in each hop.

In FIG. 14, two different UEs may use the same time-frequency resources in some cases, and to this end, the two different UEs should use the same RS sequence and scrambling code and the same amount of frequency resources. Accordingly, the present disclosure proposes a method of configuring a different RS sequence generation ID and scrambling sequence generation ID in each hop according to relayed messages. That is, a transmission UE may signal to another UE an RS sequence generation ID, the amount of resources to be used for relaying, etc. through a physical layer signal or a higher layer signal.

Meanwhile, the congestion measurement and control method depending on antenna panels and beam directions may be used not only for relaying but also for general packet transmission.

The present disclosure is not limited to direct communication between UEs. That is, the disclosure may be used for uplink or downlink communication, and in this case, the proposed methods may be used by a BS, a relay node, etc. Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, a rule may be defined as follows: information on whether the proposed methods are applied (or information on rules related to the proposed methods) should be transmitted from a BS to a UE through a predefined signal (e.g., a physical layer signal, a higher layer signal, etc.).

Figure 15:
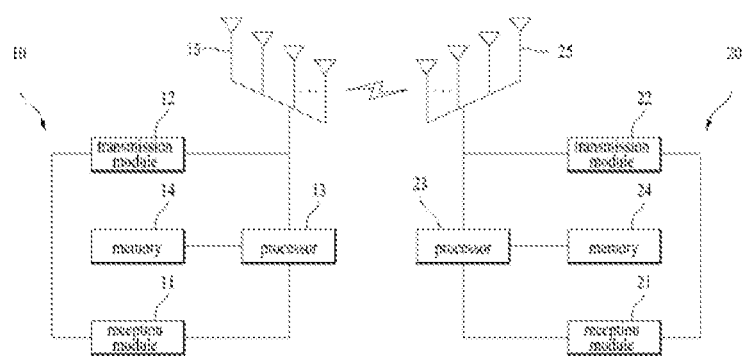
FIG. 15 is a block diagram of transmission and reception apparatuses.

FIG. 15 is a diagram schematically illustrating a UE performing D2D communication according to of the present disclosure.

Referring to FIG. 15, a UE 20 may include a reception module 21, a transmission module 22, a processor 23, a memory 24, and a plurality of antennas 25. The plurality of antennas 25 may mean that the UE supports multiple-input multiple-output (MIMO) transmission and reception. A transceiver may include the reception module 22 and the transmission module 21. The reception module 21 may be configured to receive various signals, data, and information from a BS in downlink or receive a D2D signal (sidelink signal) from another UE. The transmission module 22 may be configured to transmit various signals, data, and information to a BS in uplink or transmit a D2D signal (sidelink signal) to another UE. The processor 23 may be configured to control overall operations of the UE 20.

The processor 23 of the UE 20 according to an embodiment of the present disclosure may be configured to perform the processes required for the above-described embodiments.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present disclosure may be applied independently or implemented such that two or more of the embodiments are applied at the same time. For clarity, redundant description is omitted.

In the example of FIG. 15, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of performing device-to-device (D2D) relay communication by a user equipment (UE) in a wireless communication system, the method comprising:
receiving a beamformed first signal including counter information and a message, wherein the counter information includes a counter comparison value for each of a plurality of directions and a counter value corresponding to a number of hops related to each of the plurality of directions direction;
determining at least one transmission direction by comparing the counter comparison value and the counter value for the each of the plurality of directions; and
transmitting a second signal for relaying the message by applying beamforming to each of the determined at least one transmission direction,
wherein the second signal further includes the counter information in which the counter value corresponding to the applied beamforming direction is changed by a predetermined value, and
wherein the predetermined value is configured differently for the each of the plurality of directions.

2. The method of claim 1, wherein the determined at least one transmission direction is a direction in which the count value and the counter comparison value are set differently among the plurality of directions.

3. The method of claim 1, wherein the counter comparison value is configured differently for the each of the plurality of directions.

4. The method of claim 1, wherein the counter comparison value is preset to a same value for the each of the plurality of directions.

5. The method of claim 1, wherein the second signal is not transmitted in a direction in which the counter comparison value and the counter value are equal to each other among the plurality of directions.

6. The method of claim 1, wherein the at least one transmission direction corresponds to a direction of the first signal.

7. The method of claim 1, wherein the counter information is transmitted in a control signal of a physical layer of the UE or a radio resource control (RRC) signal of a higher layer.

8. The method of claim 1, further comprising allocating a resource for transmitting the second signal based on sensing information obtained by sensing a radio resource region for the at least one transmission direction.

9. A user equipment (UE) for performing device-to-device (D2D) relay communication in a wireless communication system, the UE comprising:
a transceiver; and
a processor configured to:
control the transceiver to receive a beamformed first signal including counter information and a message, wherein the counter information includes a counter comparison value for each of a plurality of directions and a counter value corresponding to a number of hops related to the each of the plurality of directions,
determine at least one transmission direction by the counter comparison value and the counter value of the each of the plurality of directions; and
control the transceiver to transmit a second signal for relaying the message by applying beamforming to each of the determined at least one transmission direction,
wherein the second signal further includes the counter information in which the counter value corresponding to the applied beamforming direction is changed by a predetermined value, and
wherein the predetermined value is configured differently for the each of the plurality of directions.

* * * * *